(12) United States Patent
Kawanishi (10) Patent No.: US 7,104,662 B2
(45) Date of Patent: Sep. 12, 2006

(54) OUTSIDE MIRROR ASSEMBLY FOR VEHICLE

(75) Inventor: Joichi Kawanishi, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 11/125,315

(22) Filed: May 10, 2005

(65) Prior Publication Data

US 2005/0254153 A1 Nov. 17, 2005

(30) Foreign Application Priority Data

May 10, 2004 (JP) .............................. 2004-140081

(51) Int. Cl.
*G02B 7/182* (2006.01)
*B60R 1/06* (2006.01)
*B60R 1/12* (2006.01)

(52) U.S. Cl. ...................... 359/871; 359/838; 362/494

(58) Field of Classification Search ................ 359/838, 359/871, 872; 362/494
See application file for complete search history.

(56) References Cited

U.S. PATENT DOCUMENTS

| | | | | |
|---|---|---|---|---|
| 5,497,306 A | * | 3/1996 | Pastrick | 362/494 |
| 5,660,457 A | * | 8/1997 | Lyons | 362/494 |
| 6,099,153 A | * | 8/2000 | Zimmermann et al. | 362/494 |
| 6,139,171 A | * | 10/2000 | Waldmann | 362/494 |
| 6,250,783 B1 | * | 6/2001 | Stidham et al. | 362/494 |
| 6,264,353 B1 | * | 7/2001 | Caraher et al. | 362/494 |
| 6,568,839 B1 | * | 5/2003 | Pastrick et al. | 362/494 |
| 6,695,465 B1 | * | 2/2004 | Apfelbeck | 362/494 |
| 6,769,798 B1 | * | 8/2004 | Mishimagi | 362/522 |
| 6,814,476 B1 | * | 11/2004 | Assinder et al. | 362/492 |
| 6,880,960 B1 | * | 4/2005 | Mishimagi | 362/522 |
| 6,932,497 B1 | * | 8/2005 | Huang | 362/494 |
| 2002/0141199 A1 | | 10/2002 | Stidham et al. | |
| 2003/0098908 A1 | * | 5/2003 | Misaiji et al. | 348/148 |

FOREIGN PATENT DOCUMENTS

| | | | |
|---|---|---|---|
| EP | 1304260 A1 | * | 4/2003 |
| FR | 2839026 | * | 4/2002 |
| JP | 58-188733 | * | 4/1983 |
| JP | 08-108799 | * | 4/1996 |
| JP | 2001-138809 | * | 5/2001 |
| JP | 2001-322492 | * | 11/2001 |
| JP | 2002-096684 | * | 4/2002 |
| JP | 2002-337606 A | | 11/2002 |
| JP | 2002-362222 A | | 12/2002 |

* cited by examiner

Primary Examiner—Ricky D. Shafer
(74) Attorney, Agent, or Firm—Foley & Lardner LLP (57) ABSTRACT

An outside mirror assembly for a vehicle includes a mirror housing; an accessory part; a temporary fixing unit that temporarily fixes the accessory part to the mirror housing; and a permanent fixing unit that permanently fixes the accessory part to the mirror housing. The temporary fixing unit includes a first guide positioning part provided in the mirror housing and a second guide positioning part provided in the accessory part. The first and the second guide positioning parts perform a positioning of the accessory part with a first guide in a first direction and a second guide in a second direction. The first direction and the second direction are substantially perpendicular to a direction of setting the accessory part to the mirror housing, respectively, and substantially perpendicular to each other.

5 Claims, 11 Drawing Sheets

OUTSIDE MIRROR ASSEMBLY FOR VEHICLE

CROSS-REFERENCE TO RELATED APPLICATIONS

The present document incorporates by reference the entire contents of Japanese priority document, 2004-140081 filed in Japan on May 10, 2004.

BACKGROUND OF THE INVENTION

1) Field of the Invention

The present invention relates to a vehicle outside mirror assembly that includes an accessory part such as an illuminator and an imaging unit.

2) Description of the Related Art

As this type of vehicle outside mirror assembly, there is, for example, a technology disclosed in Japanese Patent Application Laid-Open No. 2002-337606 (hereinafter, "related technology"), which is explained below. Reference signs inside parentheses below correspond to those in the related technology. A base portion (81) of a lamp unit (8) is inserted into an opening portion (101) of a cover body (10) and is joined to the back surface of a housing body (11) with a clip (85). An irradiating portion (82) of the lamp unit (8) is fitted into the opening portion (101) of the cover body (10) by connection force of the clip (85).

However, the related technology has no guide positioning unit used to fix the lamp unit (8) to the housing body (11) and the cover body (10). Therefore, some problem remains on the fixture of the lamp unit (8) thereto.

SUMMARY OF THE INVENTION

It is an object of the present invention to solve at least the above problems in the conventional technology.

An outside mirror assembly for a vehicle according to one aspect of the present invention includes a mirror housing that encloses the outside mirror assembly; an accessory part including at least one of an illuminator and an imaging unit; a temporary fixing unit that temporarily fixes the accessory part to the mirror housing; and a permanent fixing unit that permanently fixes the accessory part to the mirror housing. The temporary fixing unit is formed with a first guide positioning part provided in the mirror housing and a second guide positioning part provided in the accessory part. The first guide positioning part and the second guide positioning part perform, when temporarily fixing the accessory part to the mirror housing, a positioning of the accessory part with a first guide in a first direction and a second guide in a second direction. The first direction and the second direction are substantially perpendicular to a direction of setting the accessory part to the mirror housing, respectively, and substantially perpendicular to each other.

The other objects, features, and advantages of the present invention are specifically set forth in or will become apparent from the following detailed description of the invention when read in conjunction with the accompanying drawings.

DETAILED DESCRIPTION

Exemplary embodiments of an outside mirror assembly for a vehicle according to the present invention are explained in detail below with reference to the accompanying drawings. It should be noted that the present invention is not limited by the present embodiments.

A configuration of the vehicle outside mirror assembly according to an embodiment of the present invention is explained below. In the drawings, reference sign F indicates the front side of a car (vehicle) (in a travel direction of the car). Reference sign "B" indicates the back side of the car. Reference sign "U" indicates the upper side when viewed from the driver's seat. Reference sign "D" indicates the lower side when viewed from the driver's seat. Reference sign "L" indicates the left side when viewed from the driver's seat. Reference sign "R" indicates the right side when viewed from the driver's seat.

In the drawings, reference sign 1 indicates a vehicle outside mirror assembly according to the present embodiment. The vehicle outside mirror assembly 1 is a door mirror for a car in this embodiment (hereinafter, "door mirror"). The door mirror 1 of the present embodiment is supposed to be mounted on doors in both sides of the car, although it is not shown. It is noted that the door mirror 1 depicted herein is mounted on the door of the left side L of the car, and a door mirror mounted on a door of the right side R of the car is substantially symmetric to the door mirror 1.

Figure 1:
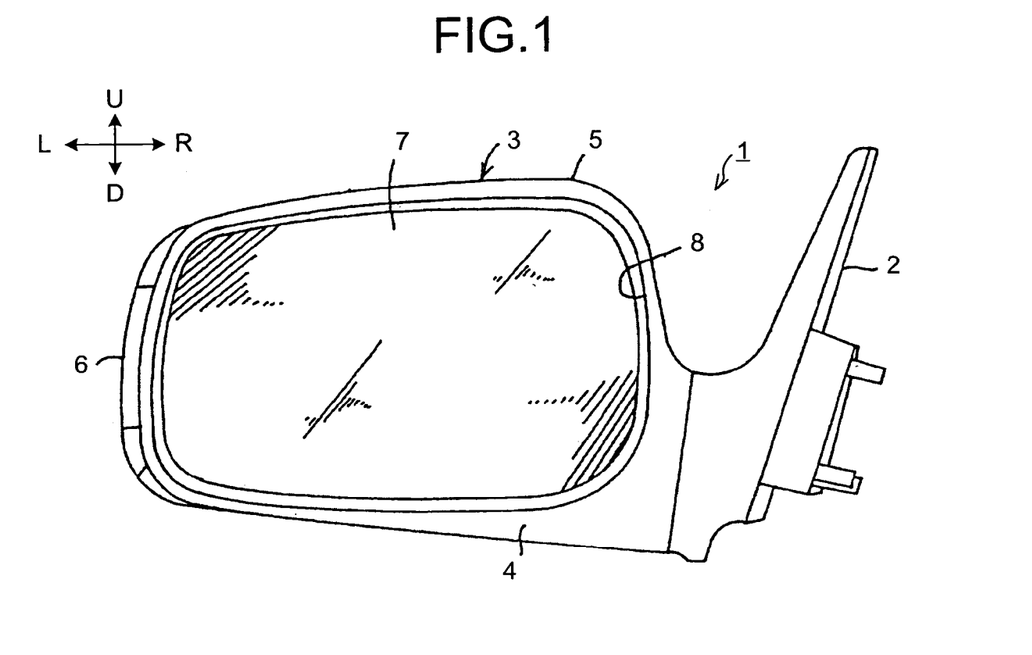
FIG. 1 is a front view of a vehicle outside mirror assembly according to an embodiment of the present invention.
Figure 2:
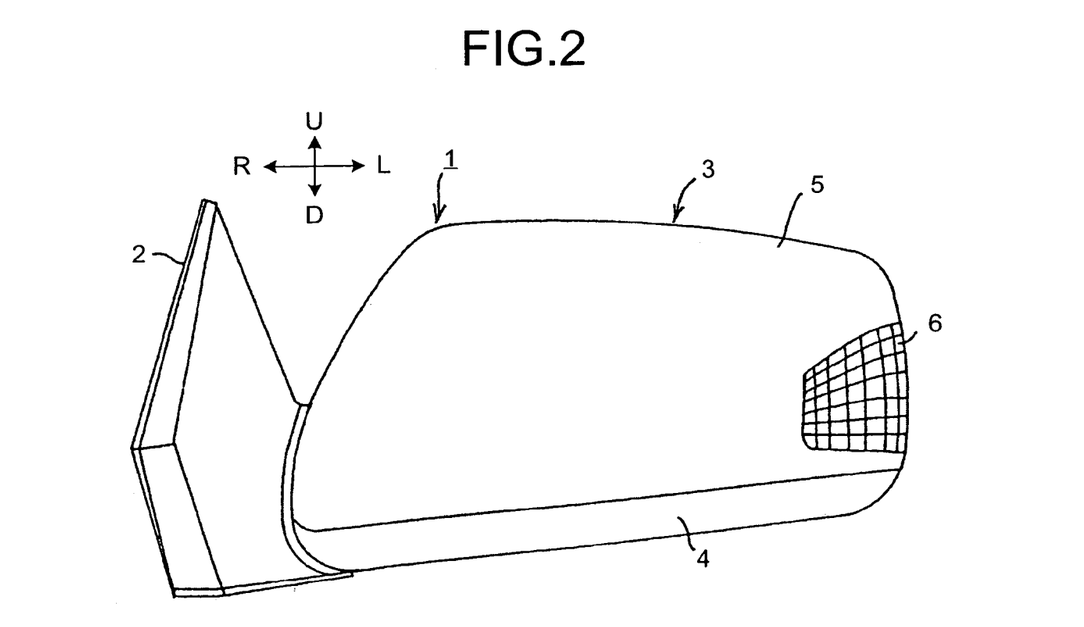
FIG. 2 is a rear view of the vehicle outside mirror assembly.
Figure 3:
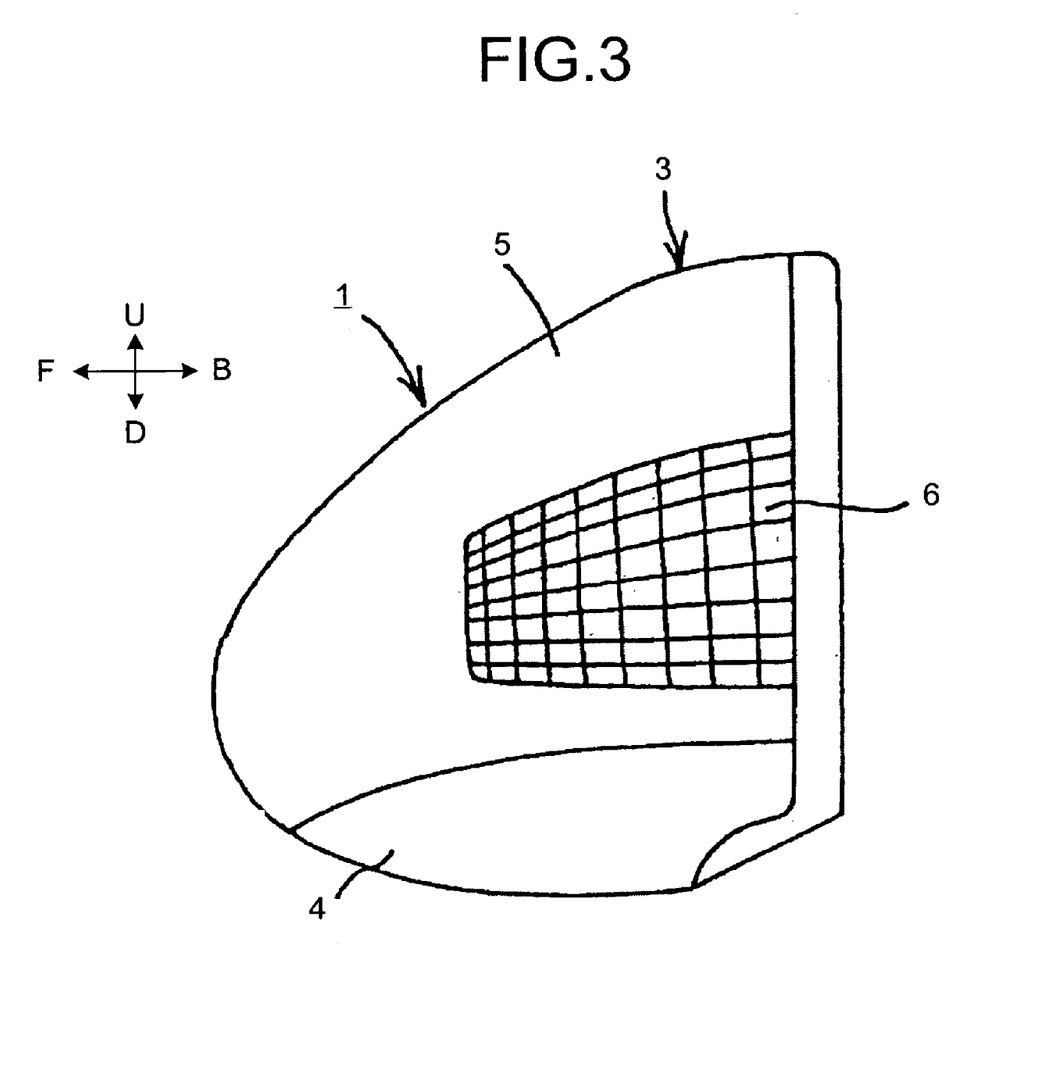
FIG. 3 is a left side view of the vehicle outside mirror assembly.

As shown in FIG. 1 to FIG. 3, the door mirror 1 includes a base 2 fixed to the door, and a mirror assembly 3 mounted on the base 2. The mirror assembly 3 includes a mirror housing 4, a garnish 5, a turn-signal lamp 6, and a mirror unit 7.

Figure 4:
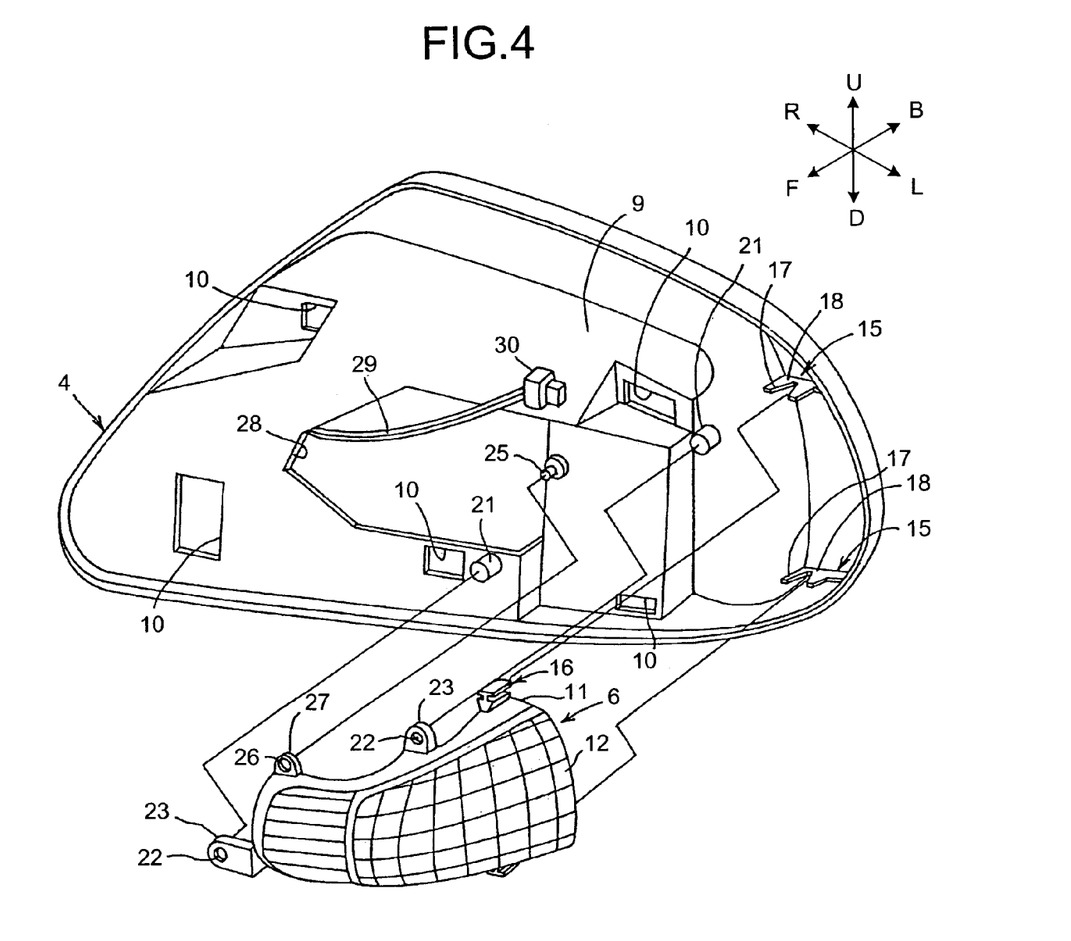
FIG. 4 is an exploded and perspective view of a mirror housing and a turn-signal lamp.

The mirror housing 4 has a portion 8 of its back side B that is opened, and a portion of its front side F and another portion 9 that are closed as shown in FIG. 4. A window portion 28 is provided at a nearly center part of the portion closed 9 of the mirror housing 4. The window portion 28 is used to wire a harness 29 for lamp from the inner side (back side B) of the mirror housing 4 to the outer side (front side F). The mirror housing 4 is secured to a fixing bracket (not shown) that is integrated with the base 2 by a screw or so (not shown). The mirror unit 7 is provided in the portion opened 8 of the mirror housing 4. The mirror unit 7 is attached to the fixing bracket so as to be tiltable nearly horizontally around its vertical axis and nearly vertically around its horizontal axis through a power unit (not shown). The mirror unit 7 has a reflecting surface to visually check the rear side of the car.

Of the portion closed 9 of the mirror housing 4, a portion of the front side F, a portion of the upper side U, and a portion of the left side L are covered with the garnish 5. The garnish 5 is separately provided for the portion of the front side F, the portion of the upper side U, and the portion of the left side L of the mirror housing 4. The garnish 5 has a shape of a cover (skull cap, design cover). The portion closed 9 of the mirror housing 4 has a plurality of rectangular engagement holes 10, for example, five in this embodiment. A plurality of engagement claws (not shown), five in this embodiment are arranged in the inner surface of the garnish 5, correspondingly to the engagement holes 10, respectively. The engagement claw is engaged in the engagement hole 10 to fix the garnish 5 to the mirror housing 4. With this fixture, the mirror housing 4 is integrated with the garnish 5.

Figure 9:
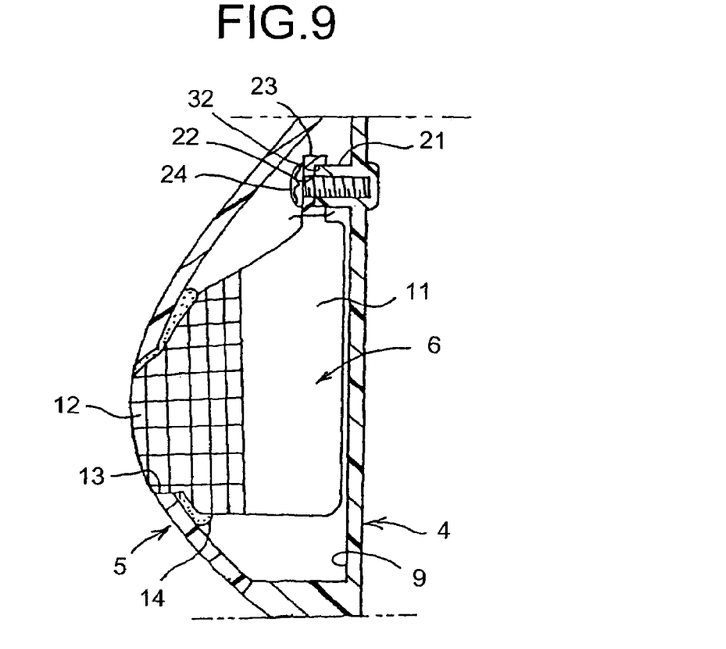
FIG. 9 is a cross section taken along a line IX—IX of FIG. 7.
Figure 10:
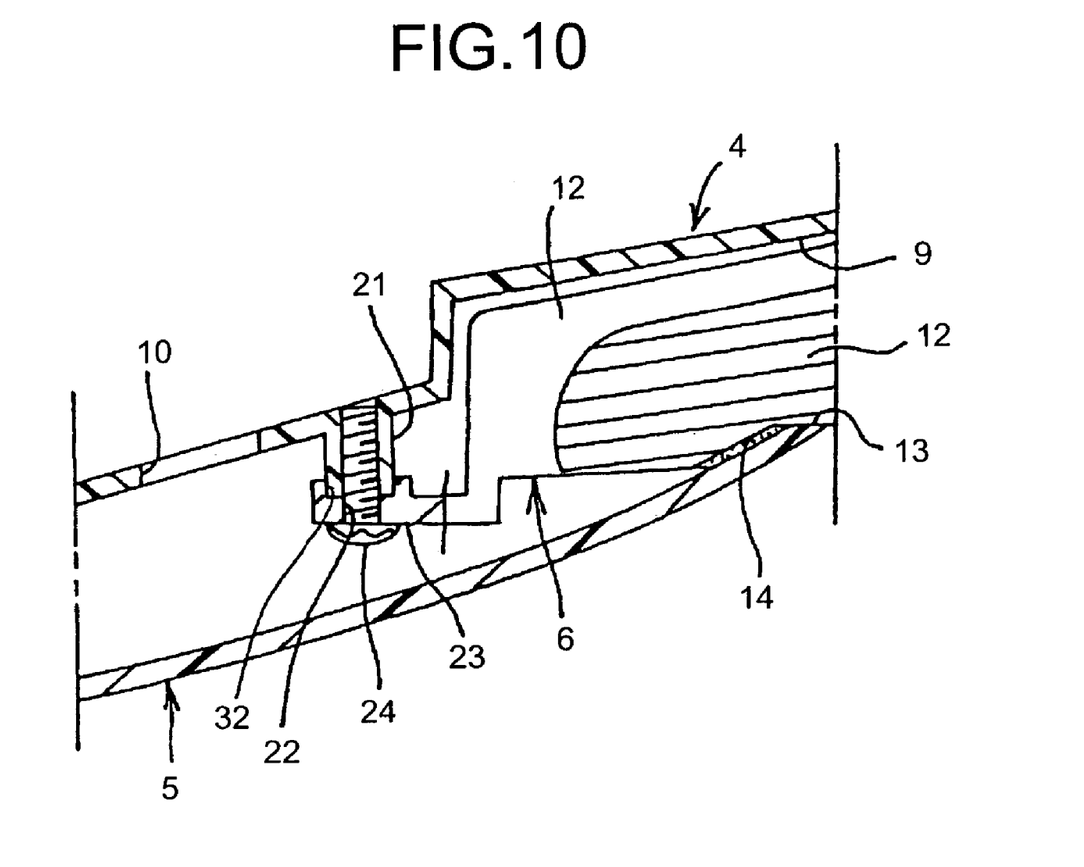
FIG. 10 is a cross section taken along a line X—X of FIG. 7.

The turn-signal lamp 6 includes a lamp housing 11 and a lamp lens 12 that form a lamp room (not shown), and at least one light emitting diode (LED) as a light source disposed in the lamp room. The turn-signal lamp 6 is fixed to a portion of the left side L of the mirror housing 4 by a temporary fixing unit and a permanent fixing unit. The lamp lens 12 of the turn-signal lamp 6 has a projection. The projection is exposed to the outside from a nearly trapezoidal notch 13 (see FIG. 9) that is arranged in the portion of the left side L of the garnish 5. Note that a packing 14 is interposed between the garnish 5 and the lamp lens 12. The turn-signal lamp 6 is a signal lamp to signal other drivers or other pedestrians of any intended change of direction by flickering light of umber color (or yellow color) and illuminating a predetermined light distribution zone with the light.

The portion of the left side L of the mirror housing 4 and the turn-signal lamp 6 have a rounded portion formed from the front side F toward the back side B, respectively. The temporary fixing unit is provided in the upper side and the lower side of the rounded portion of the mirror housing 4, and the temporary fixing unit is also provided in the upper side and the lower side of the rounded portion of the turn-signal lamp 6.

The temporary fixing unit includes a guide positioning part 15 provided in the mirror housing 4 and a guide positioning part 16 provided in the turn-signal lamp 6. When the turn-signal lamp 6 is to be temporarily fixed to the mirror housing 4, the guide positioning parts 15 and 16 are used to perform positioning with guides in a first direction and a second direction. The first direction and the second direction are substantially perpendicular with respect to a direction in which the turn-signal lamp 6 is set to the mirror housing 4, and are also substantially perpendicular to each other.

The temporary fixing unit is used to temporarily fixing the turn-signal lamp 6 to the rounded portion of the mirror housing 4. More specifically, the temporary fixture is performed by putting the portion opened 8, i.e., the back side B of the mirror housing 4 downward and fitting the turn-signal lamp 6 into the rounded portion of the mirror housing 4 by an own weight of the turn-signal lamp 6. Therefore, the direction of setting the turn-signal lamp 6 is a direction from the front side F toward the back side B of the mirror housing 4. The first direction is a horizontal direction of the mirror housing 4, whereas the second direction is a vertical direction of the mirror housing 4.

Figure 5:
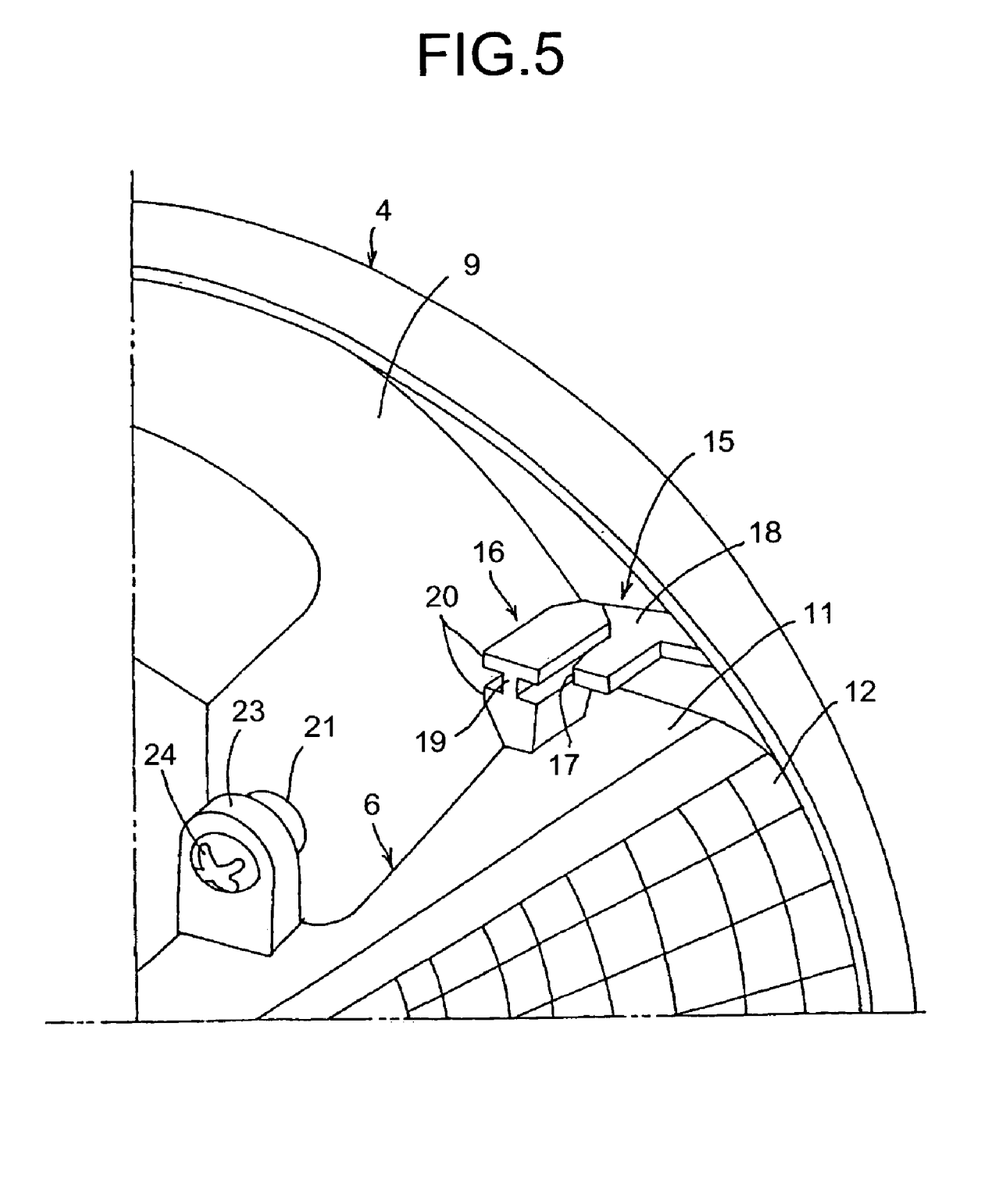
FIG. 5 is a perspective view of a main portion of how the turn-signal lamp is fixed to the mirror housing.
Figure 6:
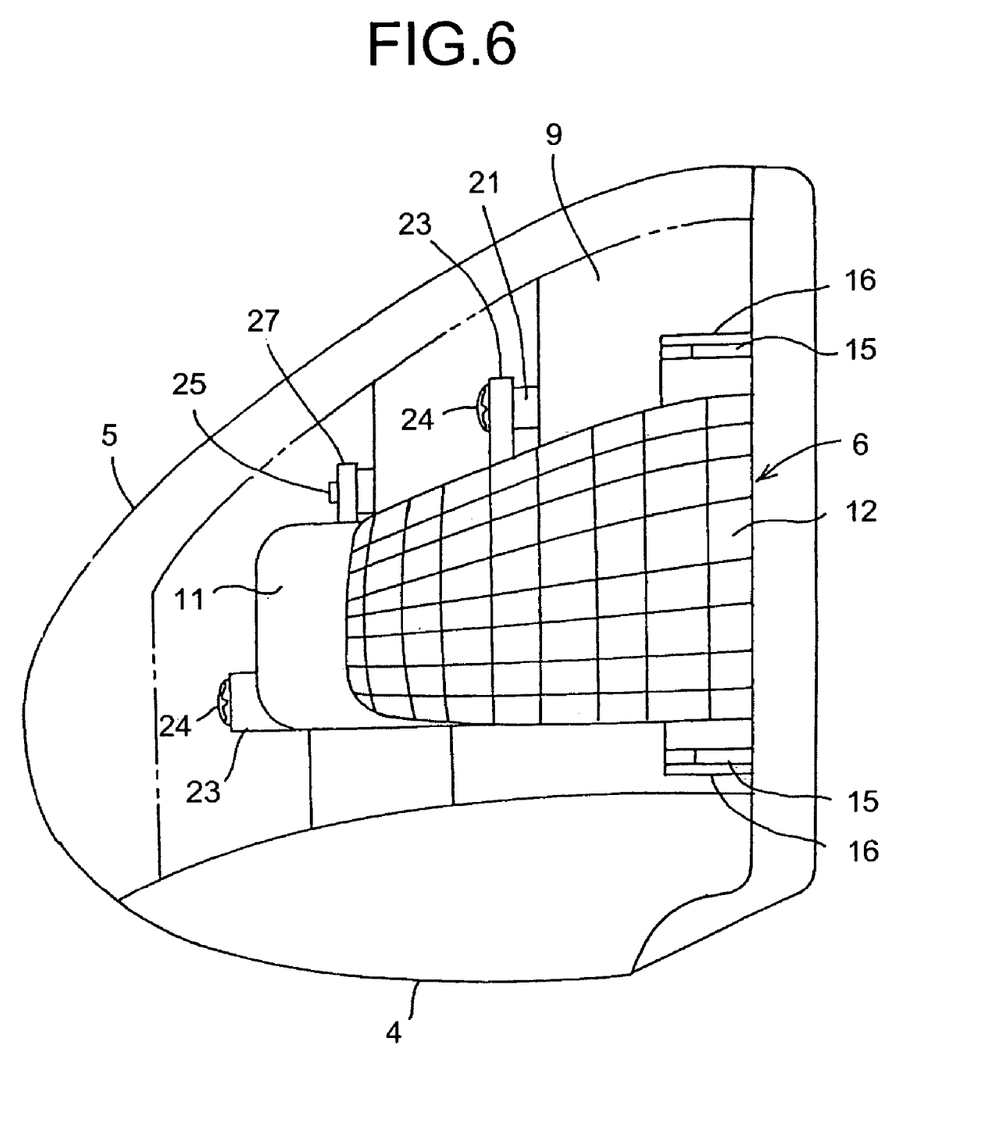
FIG. 6 is a left side view of how the turn-signal lamp is fixed to the mirror housing.
Figure 7:
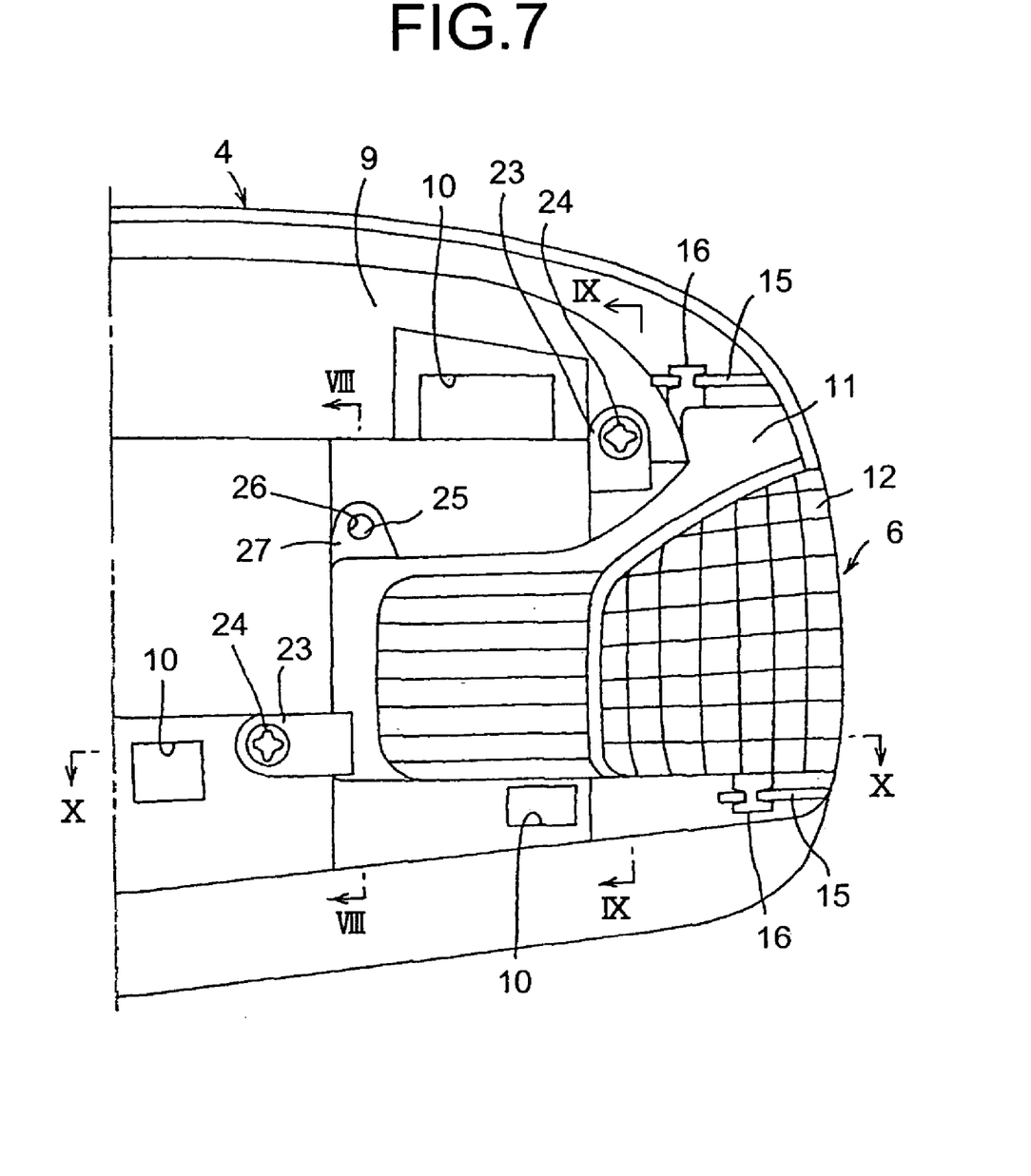
FIG. 7 is a partial rear view of how the turn-signal lamp is fixed to the mirror housing.
Figure 8:
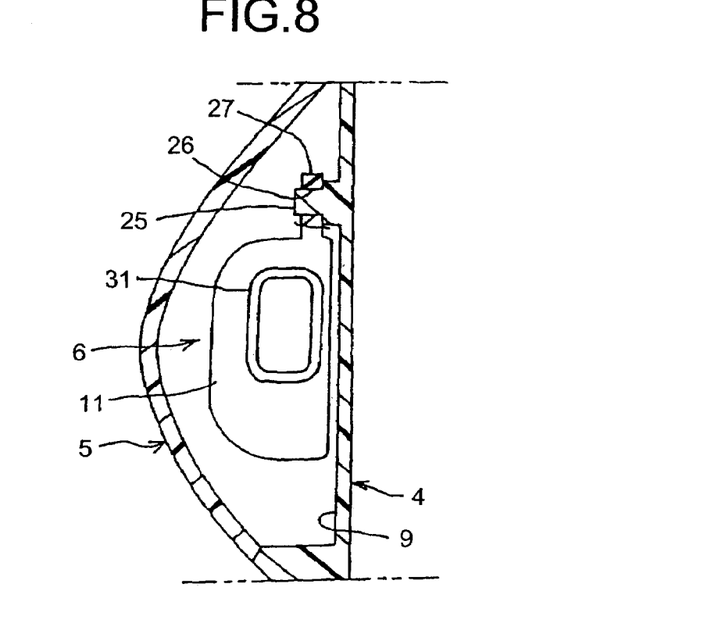
FIG. 8 is a cross section taken along a line VIII—VIII of FIG. 7.
Figure 13:
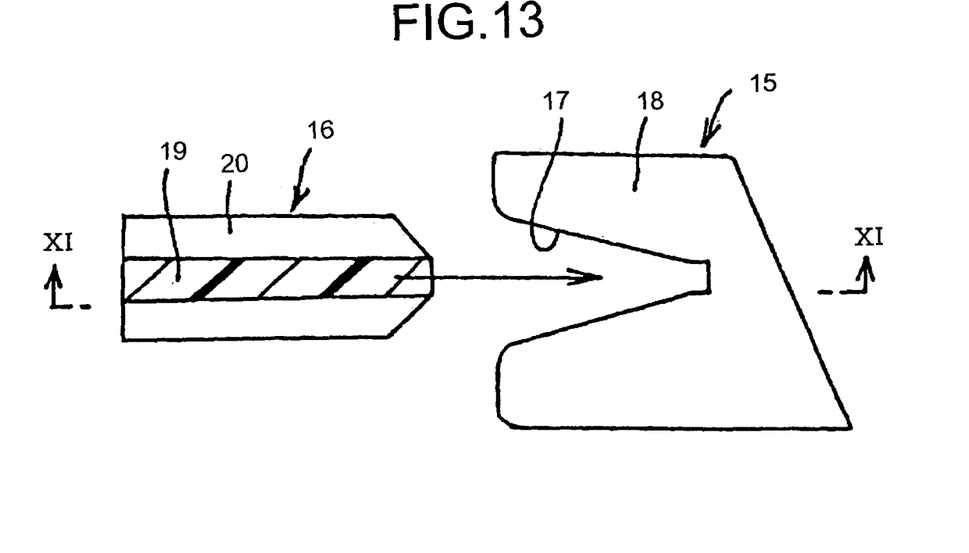
FIG. 13 is a partial horizontal cross section of the state before the guide positioning is performed between the guide groove and the guide, and is a cross section taken along a line XIII—XIII of FIG. 11.
Figure 14:
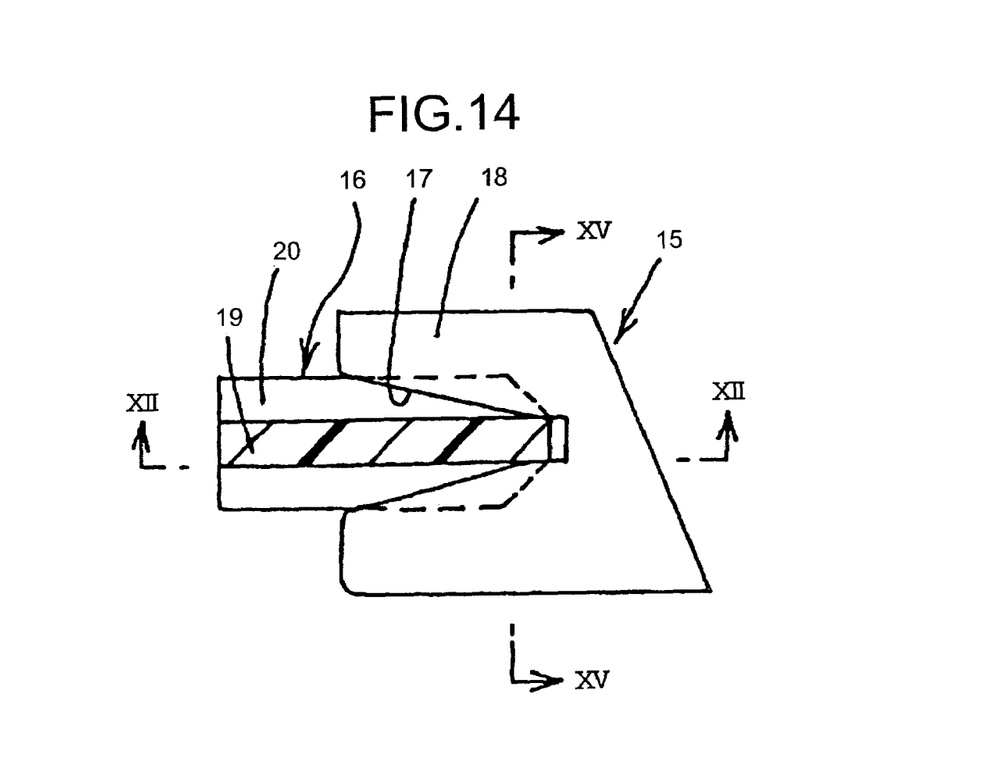
FIG. 14 is a partial horizontal cross section of the state where the guide positioning is completed between the guide groove and the guide, and is a cross section taken along a line XIV—XIV of FIG. 12.
Figure 15:
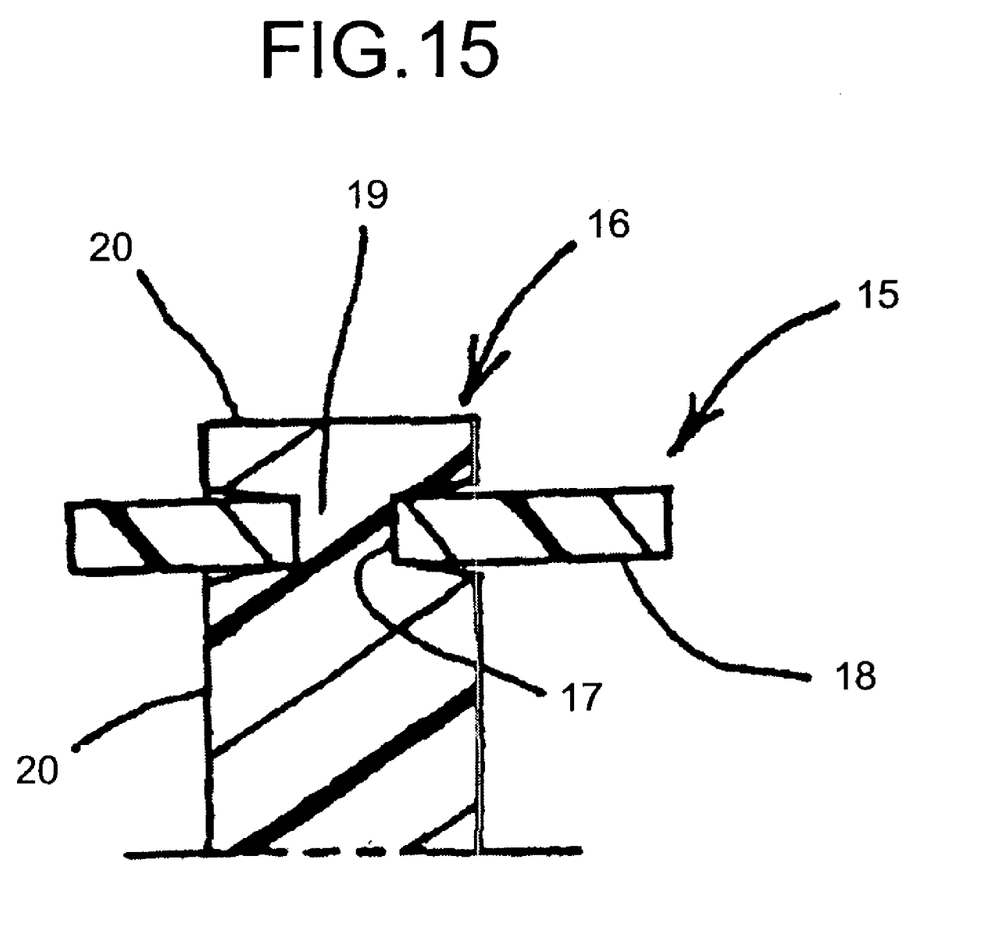
FIG. 15 is a cross section taken along a line XV—XV of FIG. 12, and a cross section taken along the line XV—XV of FIG. 14.

The guide positioning part 15 of the mirror housing 4 includes a plate part 18 that is elastic. The plate part 18 has an substantially V-shaped groove 17 of which a width becomes narrower along the direction of the setting. The guide positioning part 15 of the mirror housing 4 is hereinafter called "guide groove 15". On the other hand, as shown in FIG. 5, the guide positioning part 16 of the turn-signal lamp 6 includes an engagement plate part 19 that is elastic and is engaged into edges of the V-shaped groove 17, and a holding part 20 that is provided in the upper end and the lower end of the engagement plate part 19 and vertically holds the plate part 18 from both sides thereof. In other words, the guide positioning part 16 of the turn-signal lamp 6 is formed with an H-shaped (or I-shaped) guide rail. The guide positioning part 16 of the turn-signal lamp 6 is hereinafter called "guide rail 16". As shown in FIG. 13, the edges of the V-shaped groove 17 are substantially parallel at the back thereof. As shown in FIG. 13 to FIG. 15, the thickness of the engagement plate part 19 is substantially equal to or slightly wider than the width of the back of the V-shaped groove 17. Further, as shown in FIG. 15, the inner surfaces of the upper- and the lower holding parts 20 (surfaces facing each other) are slightly sloped so as to be widened from the engagement plate part 19 toward the outer side (horizontally) of the holding parts 20.

The rounded portion of the mirror housing 4 and the turn-signal lamp 6 have a plurality pieces of the permanent fixing unit, two pieces in this embodiment, respectively. As shown in FIG. 5, the permanent fixing unit includes a boss part 21 that is provided integrally with the mirror housing 4 in the direction of the setting, a tongue-shaped fixing part 23 that is provided integrally with the turn-signal lamp 6, and a screw 24 for securing the fixing part 23 to the boss part 21. The fixing part 23 has a through-hole 22 into which the screw 24 is inserted, and a recess 32 (see FIG. 9) into which the boss part 21 is fitted, both of which are provided in the direction of the setting.

Furthermore, as shown in FIG. 4 to FIG. 8, a guide pin 25 is provided integrally with the rounded portion of the mirror housing 4 in the direction of the setting. On the other hand, a tongue-shaped guide part 27 is provided integrally with the turn-signal lamp 6. A through-hole 26 into which the guide pin 25 is inserted is provided in the guide part 27 in the direction of the setting. The guide pin 25 and the guide part 27 with the through-hole 26 serve as a role of an auxiliary guide positioning unit and a fixing unit.

The vehicle outside mirror assembly (door mirror 1) according to the present embodiment is configured in the above manner. A fixing process for fixing the turn-signal lamp 6 to the mirror housing 4 is explained below with reference to FIG. 4 to FIG. 15.

Figure 11:
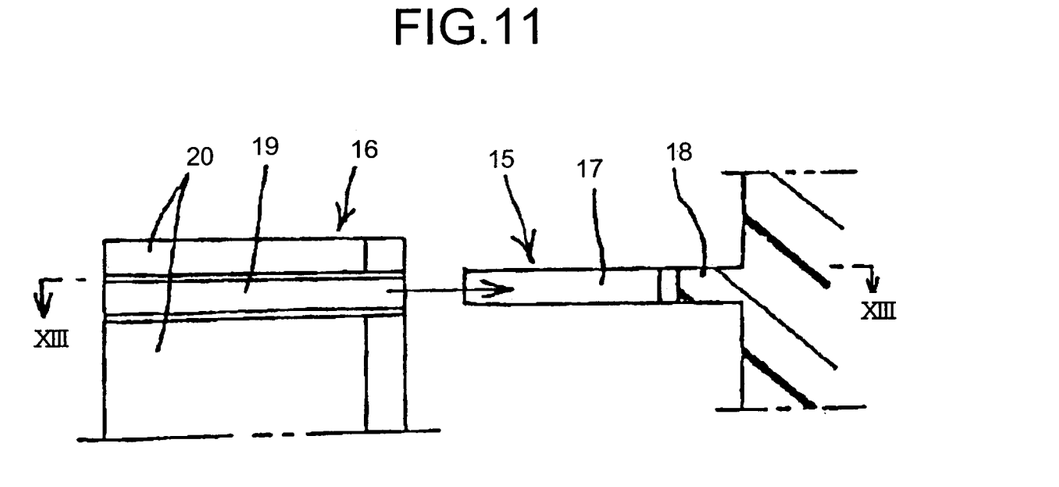
FIG. 11 is a partial vertical cross section of a state before guide positioning is performed between a guide groove and a guide rail, and is a cross section taken along a line XI—XI of FIG. 13.

At first, the base 2 and the mirror housing 4 are fixed to each other. Then, as shown in FIG. 4, the back side B of the mirror housing 4 (the portion opened 8 of the mirror housing 4) is put downward D. Next, as shown in FIG. 11 and FIG.

Figure 12:
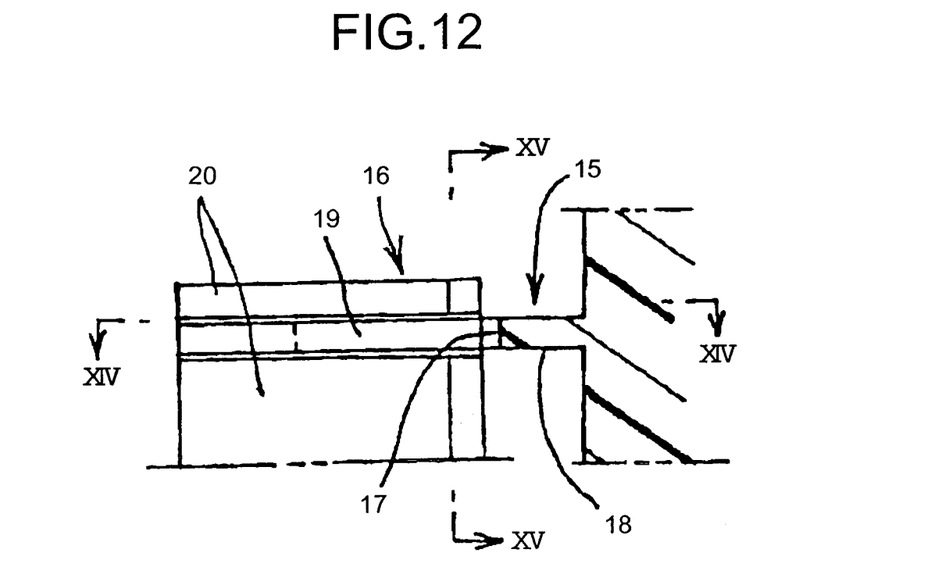
FIG. 12 is a partial vertical cross section of a state where the guide positioning is completed between the guide groove and the guide rail, and is a cross section taken along a line XII—XII of FIG. 14.

13, the turn-signal lamp 6 is set into the mirror housing 4 using a "fit-in system" (to be inserted thereinto). Then, as shown in FIG. 12, FIG. 14, and FIG. 15, each of the engagement plate parts 19 of the two guide rails 16 in the turn-signal lamp 6 is horizontally guided towards the edges of each of the V-shaped grooves 17 of two guide grooves 15 in the mirror housing 4. Consequently, the horizontal positioning is performed. The holding parts 20 of each of the two guide rails 16 in the turn-signal lamp 6 are vertically guided by holding each of the plate parts 18 of the two guide grooves 15 in the mirror housing 4. Consequently, the vertical positioning is performed. By setting the turn-signal lamp 6 into the mirror housing 4 using the fit-in system (insertion) in the above manner, the turn-signal lamp 6 can be easily and temporarily fixed to the mirror housing 4.

The plate thickness of the engagement plate part 19 is substantially equal to or slightly wider than the width of the back of the V-shaped groove 17. Therefore, by pushing the turn-signal lamp 6 into the mirror housing 4, the edges of the back of the V-shaped groove 17 engage into the engagement plate part 19. With this engagement, the turn-signal lamp 6 is temporarily fixed more securely to the mirror housing 4. Moreover, the inner surfaces of the upper- and the lower holding parts 20 are slightly sloped so as to be widened from the engagement plate part 19 toward the outer side of the holding parts 20. Therefore, the turn-signal lamp 6 can be more easily and reliably guided to the mirror housing 4, where the two are positioned.

The turn-signal lamp 6 is temporarily fixed to the mirror housing 4 easily and securely in the above manner by the temporary fixing unit. At this time, the two fixing parts 23 of the turn-signal lamp 6 are fixed on the two boss parts 21 of the mirror housing 4, respectively. In other words, each edge of the boss parts 21 is fitted into each recess part 32 of the fixing parts 23. The guide pin 25 of the mirror housing 4 is also fitted into the through-hole 26 of the guide part 27 of the turn-signal lamp 6.

Next, two screws 24 are screwed into the boss parts 21 through the through-holes 26 of the fixing parts 23, respectively. Resultantly, the turn-signal lamp 6 is permanently fixed to the mirror housing 4 by the permanent fixing unit. At this time, combination of the permanent fixture by the permanent fixing unit and the temporary fixture by the temporary fixing unit allows secure fixture of the turn-signal lamp 6 to the mirror housing 4. A connector 30 of the harness 29 for lamp is connected to a connector 31 (see FIG. 8) of the turn-signal lamp 6 that is fixed to the mirror housing 4. After the turn-signal lamp 6 is fixed to the mirror housing 4, the garnish 5 is fixed to the mirror housing 4. The fixing process of the turn-signal lamp 6 to the mirror housing 4 may be performed in a process earlier than a process of fixing the mirror unit 7 and the power unit to the base 2 (fixing bracket), or may be performed in a post process.

The vehicle outside mirror assembly (door mirror 1) according to the present embodiment is configured in the above manner. The processes and effects of the vehicle outside mirror assembly (door mirror 1) according to the present embodiment are explained below.

The turn-signal lamp 6 is set in the rounded portion of the mirror housing 4. Then, the mirror housing 4 and the turn-signal lamp 6 are guided in the first direction (horizontal direction) and the second direction (vertical direction) and positioned by "elastic restoring force upon temporary fixing" of the temporary fixing unit that includes the two guide grooves 15 provided in the mirror housing 4, and the two guide rails 16 provided in the turn-signal lamp 6. The first direction and the second direction are substantially perpendicular with respect to a direction in which the turn-signal lamp 6 is set to the mirror housing 4, and are also substantially perpendicular to each other. Thus, the turn-signal lamp 6 is permanently fixed to the mirror housing 4 through the guide positioning performed by the elastic restoring force upon temporary fixing of the temporary fixing unit, which makes it possible that the door mirror 1 has the turn-signal lamp 6 easily and securely fixed to the mirror housing 4.

Particularly, the door mirror 1 includes the guide positioning parts 15 and 16 each of which has the temporary fixing unit provided in both the mirror housing 4 and the turn-signal lamp 6. The guide groove 15 that is the guide positioning part 15 in the mirror housing 4 is formed with the plate part 18. The plate part 18 has the substantially V-shaped groove 17 of which width becomes narrower along the direction of the setting. On the other hand, the guide rail 16 that is the guide positioning part 16 in the turn-signal lamp 6 includes the engagement plate part 19 that engages into the edges of the V-shaped groove 17, and the holding part 20 that is provided in the upper end and the lower end of the engagement plate part 19 and vertically holds the plate part 18 from both sides thereof. As explained above, in the door mirror 1, the mirror housing 4 and the turn-signal lamp 6 can be temporarily fixed to each other easily and securely by the temporary fixing unit having the simple configuration.

In the door mirror 1, the plate thickness of the engagement plate part 19 is substantially equal to or slightly wider than the width of the back of the V-shaped groove 17. Therefore, by pushing the turn-signal lamp 6 into the mirror housing 4, the edges of the back of the V-shaped groove 17 engage into the engagement plate part 19. This allows the turn-signal lamp 6 to be temporarily fixed more securely to the mirror housing 4. Moreover, the inner surfaces of the upper- and the lower holding parts 20 are slightly sloped so as to be widened from the engagement plate part 19 toward the outer side of the holding parts 20. Therefore, the turn-signal lamp 6 can be more easily and reliably guided to the mirror housing 4 where the positioning is performed.

In the door mirror 1, the edge of the boss part 21 of the permanent fixing unit is fitted into the recess part 32 of the fixing part 23. Therefore, the guide positioning can be more easily and reliably performed between the turn-signal lamp 6 and the mirror housing 4. Moreover, the turn-signal lamp 6 can be more securely fixed to the mirror housing 4.

In the door mirror 1, the turn-signal lamp 6 is set in the mirror housing 4 using the "fit-in system" (insertion). Therefore, the turn-signal lamp 6 can be temporarily fixed easily to the mirror housing 4.

Although the door mirror is explained according to the present embodiment, the present invention may be applied to another outside mirror assembly for vehicles such as a fender mirror and a truck mirror.

According to the present embodiment, the mirror assembly 3 is impossible to be tilted with respect to the base 2. However, the present invention may be configured so that the mirror assembly may be tiltable manually, electrically, or by cushioning with respect to the base.

Furthermore, according to the present embodiment, the turn-signal lamp 6 has been explained as the accessory part. However, as the accessory part, the present invention may include any illuminator other than the turn-signal lamp 6, or an imaging unit such as a charge-coupled device (CCD) camera.

Moreover, according to the present embodiment, two pieces of the guide positioning parts 15 and 16 (guide groove 15 and guide rail 16) are provided as the temporary fixing unit. However, the present invention may include one or three or more pieces of the guide positioning parts 15 and 16 (guide groove 15 and guide rail 16).

Furthermore, according to the present embodiment, the fixing part 23 having two pieces of the boss parts 21 and the through-holes 22 is provided as the permanent fixing unit. However, the present invention may include the fixing part 23 having one or three or more pieces of the boss parts 21 and the through-holes 22.

Moreover, according to the present embodiment, the guide part 27 including the guide pin 25 and the through-hole 26 is provided. However, the present invention may exclude the guide part 27 including the guide pin 25 and the through-hole 26.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An outside mirror assembly for a vehicle, comprising:
    a mirror housing that encloses a mirror;
    an accessory part including at least one of an illuminator or an imaging unit;
    a temporary fixing unit that temporarily fixes the accessory part to the mirror housing; and
    a permanent fixing unit that permanently fixes the accessory part to the mirror housing, wherein
    the temporary fixing unit is formed with a first guide positioning part provided in the mirror housing and a second guide positioning part provided in the accessory part,
    the first guide positioning part and the second guide positioning part perform, when temporarily fixing the accessory part to the mirror housing, a positioning of the accessory part with a first guide in a first direction and a second guide in a second direction, and the first direction and the second direction are substantially perpendicular to each other, wherein
    either of the first guide positioning part and the second guide positioning part is formed with a plate having a substantially V-shaped groove of which a width becomes narrower along a direction of setting the accessory part to the mirror housing, and
    an other of the first guide positioning part and the second guide positioning part includes an engagement plate that engages into an edge of the substantially V-shaped groove, and two pieces of holding parts that are provided in opposing ends of the engagement plate which hold the plate having the substantially V-shaped groove from both sides.

2. An outside minor assembly for a vehicle, comprising:
    a mirror housing that encloses a mirror;
    an accessory part including at least one of an illuminator or an imaging unit;
    a temporary fixing unit that temporarily fixes the accessory part to the mirror housing; and
    a permanent fixing unit that permanently fixes the accessory part to the mirror housing, wherein
    the temporary fixing unit is formed with a first guide positioning part provided in the mirror housing and a second guide positioning part provided in the accessory part,
    the first guide positioning part and the second guide positioning part perform, when temporarily fixing the accessory part to the mirror housing, a positioning of the accessory part with a first guide in a first direction and a second guide in a second direction, and
    the first direction and the second direction are substantially perpendicular to a direction of setting the accessory part to the mirror housing, respectively, and substantially perpendicular to each other, wherein
    either of the first guide positioning part and the second guide positioning part is formed with a plate having a substantially V-shaped groove of which a width becomes narrower along the direction of setting the accessory part to the mirror housing, and
    an other of the first guide positioning part and the second guide positioning part includes an engagement plate that engages into an edge of the substantially V-shaped groove, and two pieces of holding parts that are provided in opposing ends of the engagement plate which hold the plate having the substantially V-shaped groove from both sides.

3. The outside mirror assembly according to claim 2, wherein
    a thickness of the engagement plate is substantially equal to or slightly wider than a width of a back of the V-shaped groove, and
    inner surfaces of the two pieces of the holding parts are slightly sloped so as to be widened from the engagement plate toward an outer side of the holding parts.

4. The outside mirror assembly according to claim 2, wherein
    the permanent fixing unit includes
        at least one boss part provided in either one of the mirror housing or the accessory part in the direction of setting the accessory part to the mirror housing;
        at least one fixing part provided in an other of the mirror housing or the accessory part corresponding to the at least one boss part; and
        a screw that secures the at least one fixing part to the at least one boss part, and
    the fixing part includes a through-hole into which the screw is inserted and a recess part into which the boss part is fitted, provided in the direction of setting the accessory part to the mirror housing.

5. The outside mirror assembly according to claim 2, wherein
    the direction of setting the accessory part to the mirror housing is a direction from a front side toward a back side of the mirror housing,
    the first direction is a horizontal direction of the mirror housing, and
    the second direction is a vertical direction of the mirror housing, and
    the accessory part is temporarily fixed to the mirror housing by dropping the accessory part into the mirror housing with the back side of the mirror housing downward.

* * * * *